United States Patent
Kales (10) Patent No.: US 10,370,101 B2
(45) Date of Patent: Aug. 6, 2019

(54) DRONE, METHOD AND SYSTEMS FOR AIRBORNE VISUALIZATION

(71) Applicant: Jolanda Jacoba Maria Kales, Katwijk (NL)

(72) Inventor: Jolanda Jacoba Maria Kales, Katwijk (NL)

(73) Assignee: Jolanda Jacoba Maria Kales, Katwijk (NL)

( * ) Notice: Subject to any disclaimer, the term of this patent is extended or adjusted under 35 U.S.C. 154(b) by 103 days.

(21) Appl. No.: 15/320,867

(22) PCT Filed: Jun. 19, 2015

(86) PCT No.: PCT/NL2015/000022
§ 371 (c)(1),
(2) Date: Dec. 21, 2016

(87) PCT Pub. No.: WO2015/199535
PCT Pub. Date: Dec. 30, 2015

(65) Prior Publication Data
US 2017/0137125 A1    May 18, 2017

(30) Foreign Application Priority Data

Jun. 23, 2014   (NL) .................................... 1040863

(51) Int. Cl.
*B64C 39/02* (2006.01)
*G05D 1/10* (2006.01)
(Continued)

(52) U.S. Cl.
CPC ............ *B64C 39/024* (2013.01); *B64C 27/10* (2013.01); *G05D 1/104* (2013.01); *G09F 9/3023* (2013.01);
(Continued)

(58) Field of Classification Search
CPC ............ B64C 39/024; B64C 2201/024; B64C 2201/12; G09F 21/10
See application file for complete search history.

(56) References Cited

U.S. PATENT DOCUMENTS

2014/0277854 A1    9/2014  Jones et al.
2016/0284256 A1*  9/2016  Wigell .................... G09F 21/06
(Continued)

FOREIGN PATENT DOCUMENTS

DE    102007054126 A1   5/2009
GB      2476149 A        6/2011
(Continued)

OTHER PUBLICATIONS

"Drones in Advertising," http://businessinsider.com/drones-in-advertising-2014-9, Sep. 29, 2014. (Year: 2014).*
(Continued)

*Primary Examiner* — Gary C Hoge
(74) *Attorney, Agent, or Firm* — Gable Gotwals (57) ABSTRACT

This invention relates to a drone, method and systems for displaying messages and/or images by using a group of one or more remotely controlled airborne drones provided with display means and controlled so the messages and/or images are created and are visual by the display means of the group of airborne drones. The display means are controlled such that the messages and/or images are 2D or 3D respectively. The display means may include LED's, OLED's or LCD based on means or DLP and/or laser projection means. The display of messages and/or images can be remotely controlled using a social gateway for airborne visualization, enabling the integration of content from end-user and marketing clients based on the drone's geographic position and social media audience profile.

15 Claims, 7 Drawing Sheets

(51) Int. Cl.
*G09F 21/10* (2006.01)
*B64C 27/10* (2006.01)
*G09F 9/302* (2006.01)
*G09F 9/33* (2006.01)
*G09F 9/35* (2006.01)

(52) U.S. Cl.
CPC ........ *G09F 21/10* (2013.01); *B64C 2201/024* (2013.01); *B64C 2201/025* (2013.01); *B64C 2201/12* (2013.01); *B64C 2201/146* (2013.01); *G09F 9/33* (2013.01); *G09F 9/35* (2013.01)

(56) References Cited

U.S. PATENT DOCUMENTS

| 2016/0351089 | A1* | 12/2016 | Salem | G09F 21/12 |
| 2017/0240279 | A1* | 8/2017 | Molnar | B05B 17/08 |
| 2017/0305547 | A1* | 10/2017 | Tamkin, Sr. | B08B 1/001 |
| 2018/0047319 | A1* | 2/2018 | Barba | G09F 13/04 |
| 2018/0165998 | A1* | 6/2018 | Bogan, III | B64C 39/02 |

FOREIGN PATENT DOCUMENTS

| WO | 2014018147 A2 | 1/2014 |
| WO | 2014080388 A2 | 5/2014 |

OTHER PUBLICATIONS

"UAS Registration Recommendations," https://jdasolutions.aero/blog/opinion-poll-on-fridays-uas-registration/, Nov. 19, 2015 (Year: 2015).*

* cited by examiner

DRONE, METHOD AND SYSTEMS FOR AIRBORNE VISUALIZATION

CROSS-REFERENCE TO RELATED APPLICATIONS

This United States application is the National Phase of PCT Application No. PCT/NL2015/000022 filed 19 Jun. 2015, which claims priority to Netherlands Patent Application No. 1040863 filed 23 Jun. 2014, each of which is incorporated herein by reference.

BACKGROUND OF THE INVENTION

Field of the Invention

This invention relates to a method and systems to enable airborne visualizations using remotely controlled airborne unmanned drones, also referred to as unmanned aerial vehicles. The drone comprises a propeller section and a display section, the display section comprising a screen for displaying messages and/or images on the front side of the screen, the display section being attached to the propeller section.

Description of Prior Art

Traditionally, visualizations like posters, billboards, banners, projectors, LED (Light-Emitting Diodes) displays and LCD (Liquid-Crystal Display) or OLED (Organic Light-Emitting Diode) screens mounted on a wall or other construction in a fixed place.

LED and LCD display technologies are widely used for visualization of graphics, text and video.

DLP (Digital Light Processing) and Laser projection technologies are used for visualization of graphics, text, video and 3D holographic projection.

Remotely controlled airborne unmanned drones have been used for many different purposes to date.

Formation control for drones has been demonstrated.

Small drone 'insects' have been developed.

Many mobile applications for smartphone or tablet use exist.

From WO 2014/080388 a police drone is known having an expandable and/or rotatable screen consisting of a flexible net of diodes. By means of a tubular motor connected to the propeller section of the drone the screen is rotated down through a slot, such that while it is hanging down orders or messages for drivers can be displayed on the screen. This drone has the disadvantage that the screen will move constantly like a flapping flag due to airflow from the propellers and from the wind. It is therefore not possible to display stable images with one or more of these known drones. Furthermore the screen must be rolled-in in order for the drone to be able to land without damaging the screen.

Therefore, object of the invention is to provide a drone, method and systems for displaying stable airborne images, whereby the drone is light-weight and the drone is able to land without damaging the screen or the drone, and whereby two or more drones may be combined at close distance in forming images on multiple adjacent screens.

These objectives are achieved by the invention by providing the display section of the drone with a screen support frame, wherein the support frame supports the edges of the screen. In particular the screen support frame comprises a first screen support element connected to the first side edge of the screen, and a second screen support element connected to the second side edge of the screen. Preferably the screen support frame comprises rear screen support elements, which support the rear face of the screen.

With these measures flapping of the screen is prevented and a stable image is ensured which is viewable unobstructed from −90 deg to +90 deg view angle (in horizontal plane) by persons on the ground on the front side of the screen.

The embodiment is preferred wherein the rear support elements are arranged for providing a wind void fraction of the screen, preferably the wind void fraction is arranged as a grid of horizontal and vertical elongated openings and/or slits within the screen, in particular the wind void fraction of the screen is chosen between 50 and 80% and is preferably approximately 65%.

It has been found that using a wind-transparent display by providing the screen with a void fraction between 50 and 80%, the handing, positioning and flight characteristics of the drone having an airborne display are maintained even when disturbing forces like wind gusts act upon the drone and the thereto connected screen.

A preferred embodiment is characterized in that a landing gear is provided which can be moved from a landing position into a retracted position at the rear face of the screen. In particular the landing gear is hingedly connected to the screen support frame, in particular a hinged connection is provided between the landing gear and both the first screen support element and the second screen support element.

By providing landing gear, which is able to be retracted behind the rear side of the screen, the screen is viewable unobstructed by persons on the ground, while at the same time a quick and safe landing can be ensured of the drone with little risk on damaging of the screen or of the drone during its landing or take-off.

In an advantageous embodiment the propeller section comprises propeller arms for mounting the propellers, preferably the propeller arms are provided with a bend, more preferably the propeller arms are mounted nearby the outer ends of the propeller section and are bent inwards towards the middle portion of the propeller section.

Providing inward bending arms for the propellers enables positioning two or more drones with displays close to each other so that images may be displayed over two or more screens of two or more drones. By attaching the arms to the outer ends of the propeller section moment of force (torque) exerted by the propellers is optimized, ensuring a good controllability of the airborne drone having a display, while maintaining the ability to combine two or more drones according to the invention for displaying an image.

Preferably the first segments of the rear face propeller arms are provided with a support arm connected to the first and second screen support elements. By providing at the rear side of the screen the first segments of the arms, which are attached to the propeller section, with a support arm, which supports on the first and second support elements respectively of the screen, torsion of the propeller section and deformation of the screen and distortion of the displayed image is reduced and instable flight is prevented.

The invention also relates to a method for displaying messages and/or images by using a group comprising two or more remotely controlled airborne drones provided with display means and controlled such that said messages and/or images are created and made visual by the display means of said group of airborne drones.

The invention also relates to a system for displaying messages and/or images, comprising a group comprising two or more remotely controlled airborne drones provided with display means according to the invention, and comprising control means arranged for controlling said drones such that said messages and/or images are created and made visual by the display means of said group of airborne drones. In particular the system comprises a software gateway for airborne visualization with artificial intelligence and analytics capabilities to determine the profile of the audience population at received drone location using social media posts and presence information; preferably a software-bidding engine is used to match airborne visualization demand with supply; more preferably the airborne visualization requirements from end-user clients and marketing clients are matched and combined through an internet gateway for display by one or more drones at a given location.

BRIEF SUMMARY OF THE INVENTION

In view of the foregoing disadvantages inherent in the known police drone and in known existing visualizations that depend on a fixed mount point on a fixed location this inventions covers a method of using remotely controlled airborne drone technology in combination with display and projection technologies to create unique mobile airborne visualization systems that can be applied anywhere outdoor as well as indoor.

Key Benefits:

1. Provide the ability to show images, videos or objects anywhere (outdoor/indoor), including places where traditionally such display was very difficult or simply not possible.
2. Ability to create very unique and attractive airborne visual displays and effects.
3. Scalability from small displays to very large displays using many drones.
4. Display visualization is no longer limited to a fixed location.
5. Airborne and wireless technology, so not fixed to a power cable or network connection.
6. Quick and easy mobile request option via a mobile device application (acting as the drones' command controller).
7. Internet social gateway for airborne visualization, enabling visuals to be displayed based on the drones geographic position trough a bidding engine

BRIEF DESCRIPTION OF THE DRAWINGS

Various other objects, features and attendant advantages of the present invention will become fully appreciated as the same becomes better understood when considered in conjunction with the following drawings, in which like reference characters designate the same or similar parts throughout the several views, and wherein.

DETAILED DESCRIPTION OF THE DRAWINGS

A. Overview

Turning now descriptively to the drawings, in which similar reference characters denote similar elements throughout the several views FIGS. 1 to 6 illustrate an exemplary embodiment of a remotely controlled unmanned airborne visualization systems according to the invention, comprising a ground station control/command unit 3, wireless communication 4 and a remotely controlled unmanned airborne drone 1.

B. Airborne LED or LCD Display, Carried by Drones.

Figure 1:
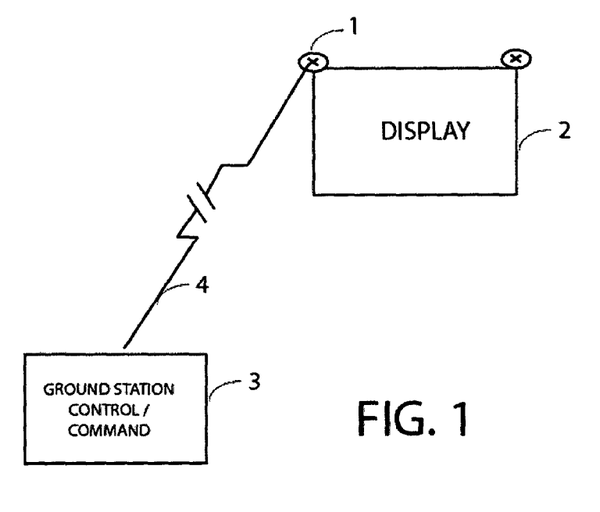
FIG. 1 is a front perspective view of an airborne LED or LCD display, carried by drones.

FIG. 1 shows a system of one or multiple airborne drones 1 carrying a LED or LCD display 2. This enables the airborne display of graphics, text and video. The drones 1 can be pre-programmed to display an image or video. Alternatively they can be equipped with wireless communication receivers 4 to stream real-time or recorded video. Global Positioning Control and Formation Control systems enable the visualization to be pre-programmed for a specific location or moving pattern across a pre-defined route in the air. Artificial intelligence technology allows the drones to automatically respond to environmental and weather conditions to manage safety and the optimization of the visualization.

C. Larger Airborne LED or LCD Display, Carried by Drones

Figure 2:
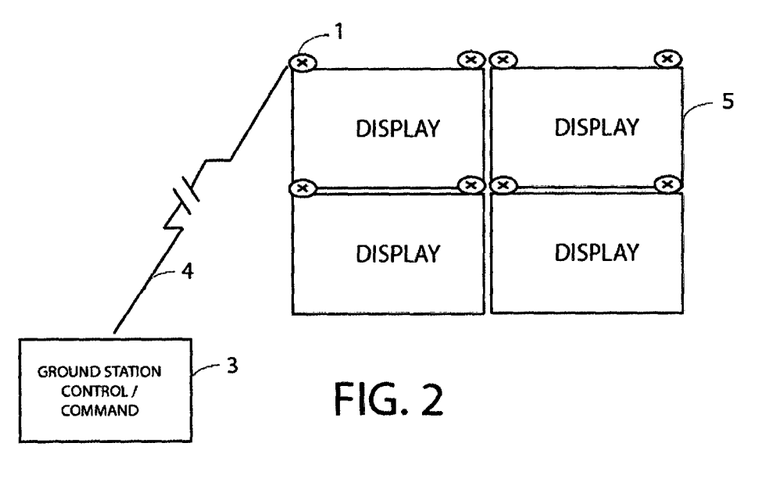
FIG. 2 is a front perspective view of a larger airborne LED or LCD display, carried by drones.

FIG. 2 shows a system of multiple remotely controlled unmanned airborne drones 1 carrying multiple LED or LCD display's 2 to create a large display 5. The size of the overall screen 4 can be very large dependant on the number of assigned remotely controlled unmanned airborne drones 1 and the number of displays 2. The drones 1 can be pre-programmed to jointly display an image or video. Alternatively they can be equipped with wireless communication receivers 4 to stream real-time or recorded video. Global Positioning Control and Formation Control systems enable the visualization to be pre-programmed for a specific location or pre-defined route or moving pattern in the air. Artificial intelligence technology allows the drones to automatically respond to environmental and weather conditions to manage safety and the optimization of the visualization. Remotely controlled unmanned airborne drones 1 will automatically return to the ground station 3 to pick-up a new battery pack or recharge when needed.

D. 2D Visualization by a Swarm of Drones.

Figure 3:
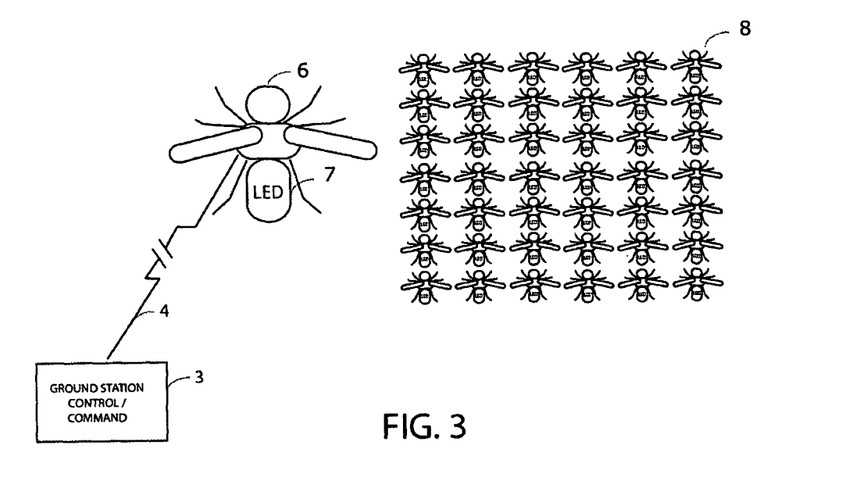
FIG. 3 on the left shows an exploded upper perspective view of a drone 'insect' equipped with a LED and on the right side a front perspective view of a 2D visualization by a group (also called "swarm" hereinafter) of drones.

FIG. 3 shows on the right side the top view perspective of a remotely controlled unmanned airborne drone 'insect' 6, equipped with a multi-colour light emitting diode (LED) 7. On the right side the front perspective view shows the application in a system whereby a swarm of remotely controlled unmanned airborne drone insects 6 equipped with a multi-colour light emitting diode (LED) 7 create a 2D visualization 8. The size of the 2D visualization 8 can range from small to large dependant on the number of assigned remotely controlled unmanned airborne drones insects 6. The drones 6 can be pre-programmed to jointly display an image or video. Alternatively they can be equipped with wireless communication receivers to stream real-time or recorded video. Global Positioning Control and Formation Control systems enable the visualization to be pre-programmed for a specific location or pre-defined route or moving pattern in the air. Artificial intelligence technology allows the drones to automatically respond to environmental and weather conditions to manage safety and the optimization of the visualization. Spare remotely controlled unmanned airborne drone insects 6 will automatically replace units in the formation that run out of battery power.

E. Airborne 3D Visualization by a Swarm of Drones.

Figure 4:
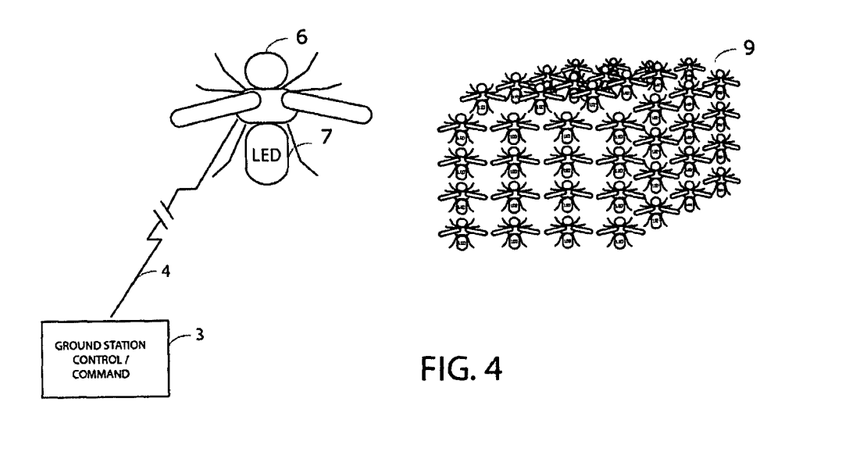
FIG. 4 on the left shows an exploded upper perspective view of a drone 'insect' equipped with a LED and on the right side a front perspective view of an airborne 3D object visualization by a swarm of drones.

FIG. 4 shows on the left side the top view perspective of a remotely controlled unmanned airborne drone 'insect' 6, equipped with a multi-colour light emitting diode (LED) 7. On the right side the front perspective view shows the application in a system whereby a swarm of remotely controlled unmanned airborne drone insects 6 equipped with a multi-colour light emitting diode (LED) 7 create 3D object visualization 9. The drones can be pre-programmed to display a still 3D object, graphic, logo or characters, but also a moving and or animated 3D object, graphic, logo or text as well as a combination of these options to generate scenery of (moving) objects and or text. When equipped with wireless receivers also real-time animated 3D video animations can be generated. The size of the airborne 3D visualization 9 can range from small to large dependant on the number of assigned remotely controlled unmanned airborne drones insects 6. Global Positioning Control and Formation Control systems enable the visualization to be pre-programmed for a specific location or moving pattern in the air. Artificial intelligence technology allows the drones to automatically respond to environmental and weather conditions to manage safety and the optimization of the visualization. Spare remotely controlled unmanned airborne drone insects 6 will automatically replace units in the formation that run out of battery power.

F. Airborne Image Projection by One or More Drones

Figure 5:
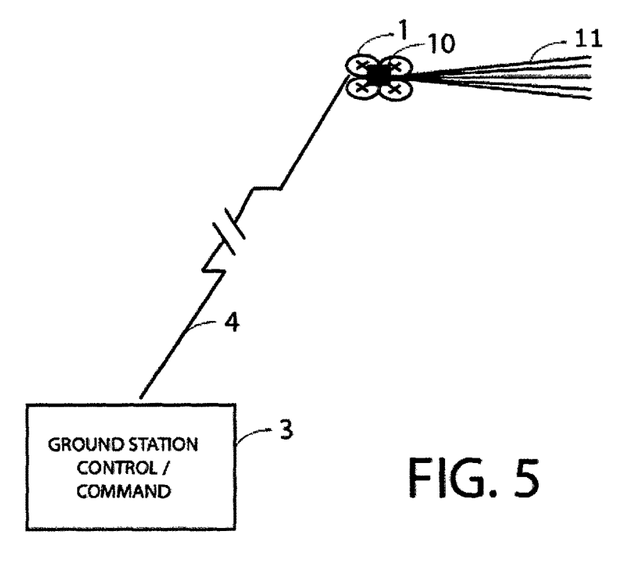
FIG. 5 is a front perspective view of airborne image projection by one or more drones.

FIG. 5 shows a system of one or multiple airborne drones 1 equipped with a projector 10. DLP, Laser or other latest projection technology is mounted on a drone or multiple drones to create unique airborne-based projections 11 anywhere in the air as well as on objects or walls. Visualization capabilities include graphics, text, and video as well as 3D holograms. These can be pre-programmed or real-time displayed. Global Positioning Control and Formation Control systems enable the projection to be pre-programmed on a specific location or moving pattern across multiple objects. Artificial intelligence technology allows the drones to automatically respond to environmental and weather conditions to manage safety and the optimization/stability of the projected visualization.

G. Mobile Airborne Visualization Request Application

Figure 6:
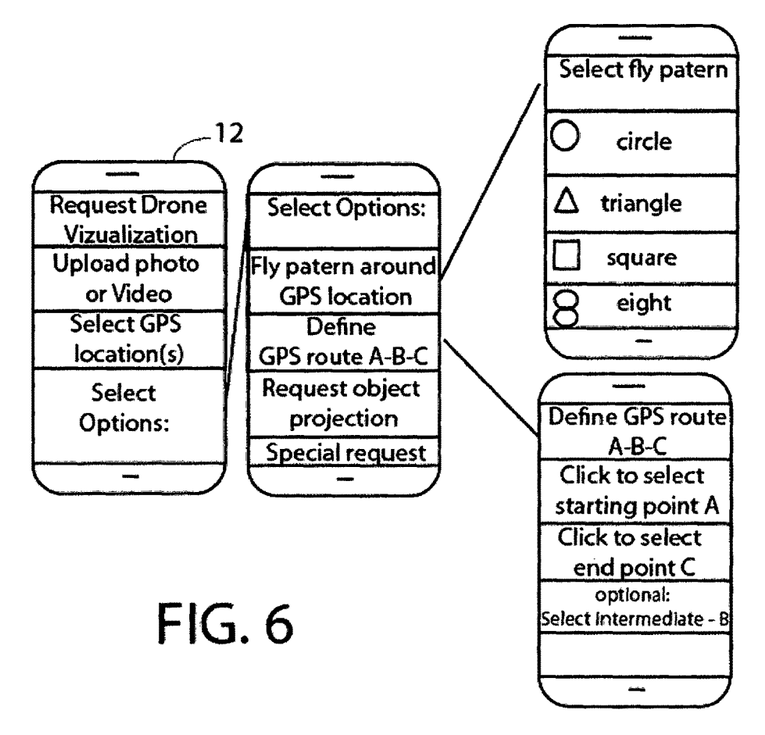
FIG. 6 is a front perspective of some of the key user interface menu options of the mobile device application to enable quick and easy requests for airborne visualization by controlling the group ("swarm") of drones.

FIG. 6 shows a front perspective of some of the key user interface menu options of the mobile device application to enable quick and easy requests for airborne visualization system. Using the mobile device 12 GPS capability it is simple to select one or multiple GPS points at which the visualization will be displayed. Upload of image or video can be selected. Flight pattern around the GPS location can be defined. When multiple GPS points are selected the route between the GPS locations can be selected.

H. Custom Drone Design for Single and Multiple Drone Airborne Visualizations.

In FIGS. 7, 8, 9A, 9B a preferred embodiment is shown of a drone according to the invention.

Figure 7:
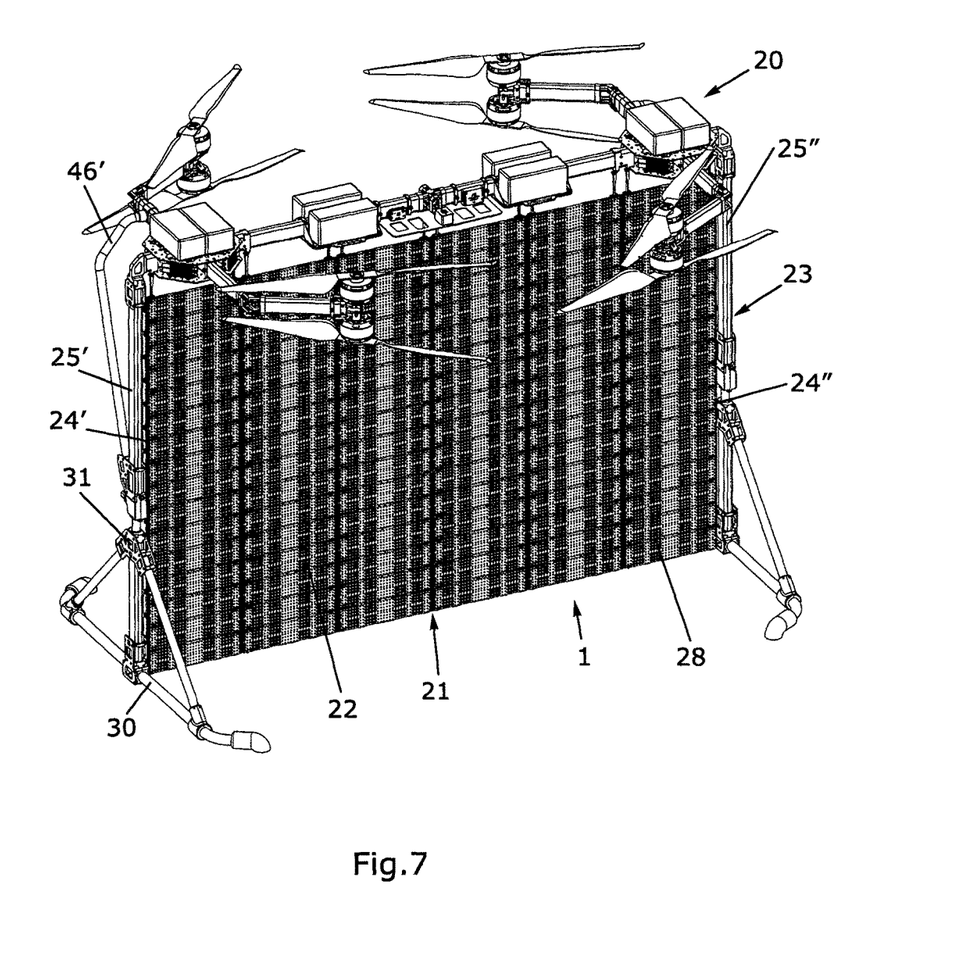
FIG. 7 is a left front perspective of a drone equipped with an OLED/LCD curtain or foil in a setup that reduces overall weight and with that increases flight time while ensuring that the drone can be safely controlled in windy conditions. In this figure the custom retractable landing gear is down on the ground for landing and take-off.

FIG. 7 is a left front perspective of a custom designed drone 1 equipped with an OLED/LCD curtain, foil or screen 22 in a setup that reduces overall weight and with that increases flight time while ensuring that the drone can be safely controlled in windy conditions. In FIG. 7 the custom retractable landing gear 30 is in the landing position and the drone is down on the ground for e.g. inspection or take-off.

FIG. 7 shows a drone 1 comprising a propeller section 20 and a display section 21, which are connected to each other; the display section comprises a screen 22 for displaying messages and/or images on the front side 28 of the screen. The display section 21 further comprises a screen support frame 23 for stabilizing the screen curtain 22 through tensioning and stretching the edges 24 of the screen, so that airflow caused by the wind and/or the propellers is not flapping the display curtain so that the image on the screen is not distorted. The screen support frame 23 is configured to form a first screen support element 25', which is connected to the first side edge 24' of the screen 22, and to from a second screen support element 25", which is connected to the second side edge 24" of the screen. Both screen support elements 25', 25" are in FIG. 7 extending perpendicular downwards, with respect to the horizontally oriented beam or boom of the propeller section 20. The landing gear 30 is hingedly connected by means of two hinged connections 31 to the first screen support element 25' and to the second screen support element 25". As a result a stable and lightweight construction of the drone is obtained, whereby the view on the screen is not obstructed and the landing gear is able to be displaced easily from the landing position to the retracted position and vice versa.

Figure 8:
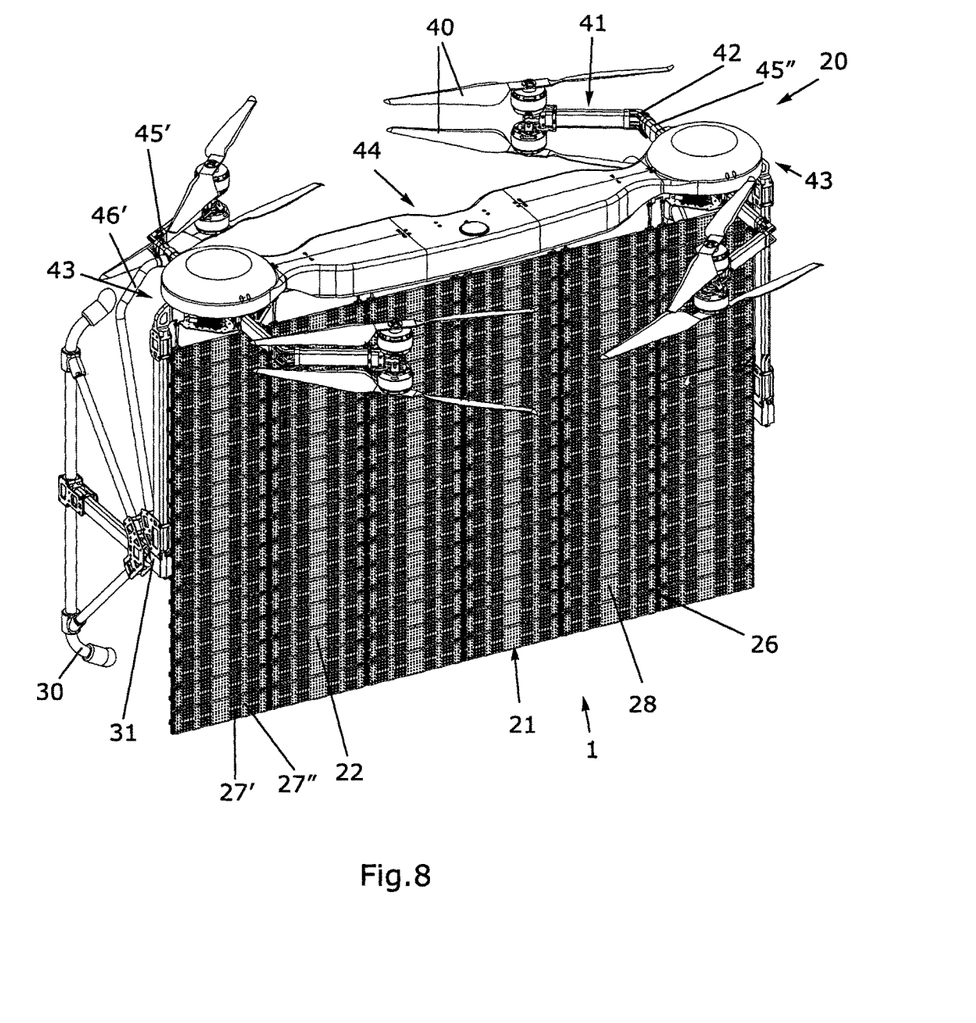
FIG. 8 is a left front perspective of a drone equipped with an OLED/LCD curtain or foil in a setup that reduces overall weight and with that increases flight time while ensuring that the drone can be safely controlled in windy conditions. In this figure the custom retractable landing gear is pulled-up such that visualizations seen from the ground are not disturbed by the landing gear.

In FIG. 8 the custom designed retractable landing gear 30 is pulled-up into the retracted position at the rear face 29 (see FIG. 9B) of the screen 22 such that visualizations seen from the ground are not disturbed by the landing gear.

In FIG. 8 the propeller section 20 is provided with housing elements covering the propulsion equipment and battery packs/power banks of the drone 1. The screen support frame 23 in this embodiment further comprises rear screen support elements 26, which support the rear face 29 (see FIG. 9B) of the screen 22. In FIG. 8 can be seen that the rear support elements 26 are arranged for providing wind-transparency to the screen by means of a wind void fraction, thereby rendering the drone less susceptible to disturbances due to airflow—wind gusts—resulting e.g. from the wind. In this example the wind void fraction is arranged as a grid of horizontal and vertical elongated openings and/or slits 27', 27" within the screen 22, thereby creating a wind void fraction of the screen between 50 and 80%; preferably the void fraction is approximately 65%, which has been found to be the optimum between a clearly displayed image on the screen and a considerably reduced susceptibility to wind and weather conditions.

Figure 9A:
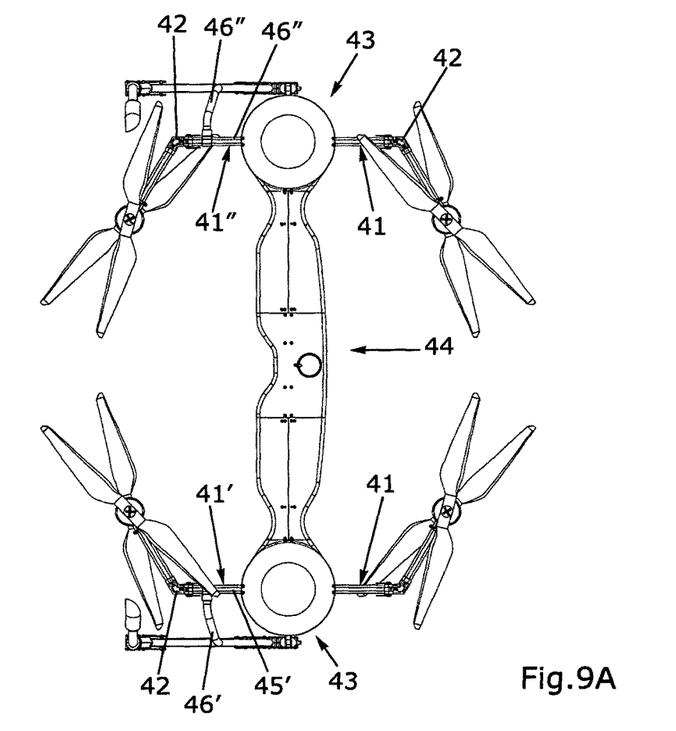
FIG. 9A is a top perspective of a drone with custom motor design for maximum thrust and inward pointed arms positioned for optimal aerodynamics such that the propellers do not interfere with each other, the display screen and other drones in close proximity, when multiple drones are used very closely next to each other and above and under each other to create larger visualizations using multiple drones in the air.

FIG. 9A shows the top perspective with custom motor design for maximum thrust and inward pointed arms positioned for optimal aerodynamics such that the propellers do not interfere with each other, the display screen and other drones in close proximity, when multiple drones are used very closely next to each other and above and under each other to create larger visualizations using multiple drones in the air.

The propeller section 20 in the shown embodiment of FIGS. 7-9B comprises two outer ends 43 and four propeller arms 41, 41', 41" for mounting the propellers 40; two arms 41 are extending above the front face 28 of the screen 22. On two arms 41', 41" are extending above the rear face 29 of the screen 22. On each arm 41, 41', 41" two propellers are provided, which are configured such, that the tips of the propellers remain within the plane defined by the propeller section 20, the support frame 23 and the landing gear 30, so that two drones are able to fly closely, adjacently in a side by side formation without the propellers touching each other. It is now possible to maintain a multiple drone formation having a mutual vertical and horizontal gap of less than about 100 mm.

As is clearly shown in FIG. 9A each propeller arm is provided with a bend 42, so that the arms bend inwardly towards the middle portion 44 of the propeller section 20. The propeller arms are mounted nearby the outer ends 43 of the propeller section so that maximum moment force or torque is exerted by the propeller arms on the propeller section, thereby increasing the controllability and correctability of the drone and thereby its flight characteristics.

During operation, if the front side and rear side propellers generate different thrust, twisting of the center carbon boom may occur, leading to instable flight and instable images on the display screen. Therefore the first segments 45', 45" of the rear face propeller arms 41', 41", which segments are located between the bend 42 and the propeller section 20, are provided with a support arm 46', 46", which support arms are connected to the first and the second screen support elements 25', 25" respectively. These support arms 46', 46" increase the structural rigidity of drone and reduce twisting of the frames and the booms and elements used therein.

Figure 9B:
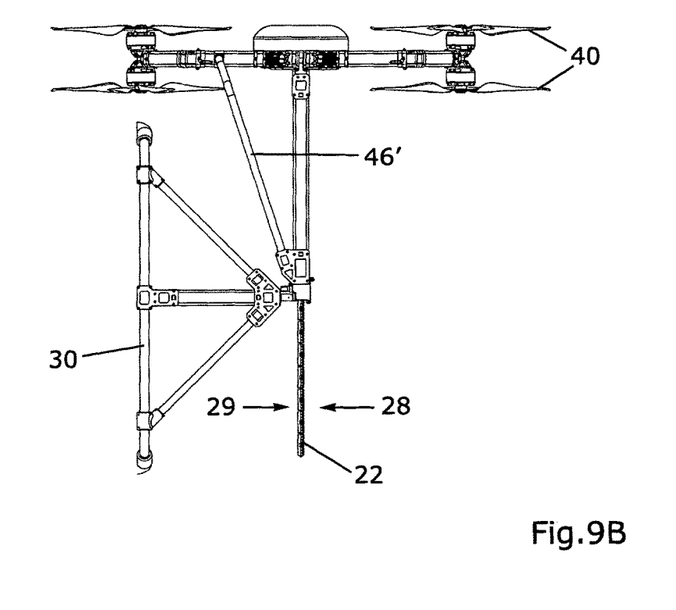
FIG. 9B is a side perspective of a drone with custom retractable landing gear pulled up during flight designed in such a way that the drone is balanced during flight and so that it does cause issues for the propeller operation. It also shows the custom designed arms between the landing gear frame and the propeller arms required to avoid twisting in case the front and back propellers generate different thrust which could potentially lead to twisting of the center carbon boom.

FIG. 9B is a side perspective of FIG. 9A with the custom retractable landing gear 30 pulled up during flight at the rear side 29 of the screen 22. The landing gear is designed in such a way that the drone is balanced during flight and so that it does cause issues for the propeller operation. It also shows the custom designed support arm 46' between the landing gear frame and the propeller arm required to avoid twisting in case the front and back propellers generate different thrust which could potentially lead to twisting of the center carbon boom.

I. Social Gateway for Airborne Visualization

Figure 10:
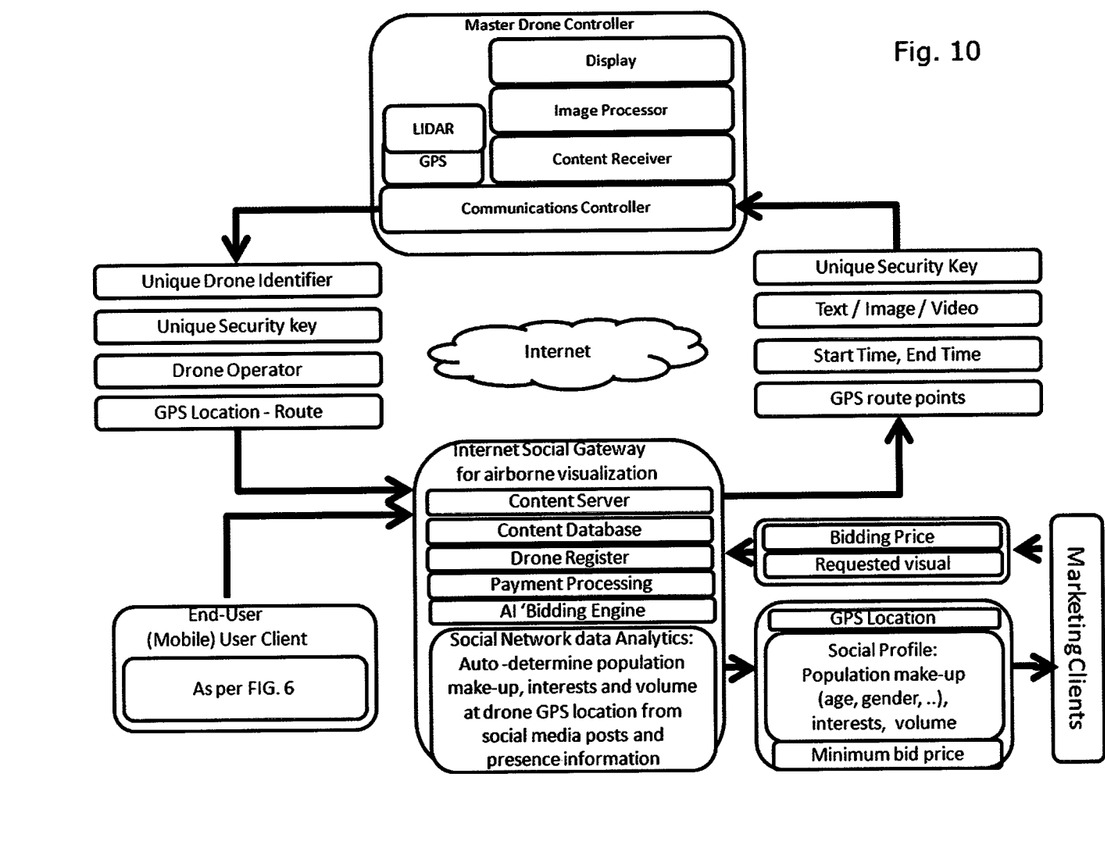
FIG. 10 is a system module and data flow overview of a Social Gateway for airborne visualization. It describes the integration from a (mobile) end-user client as per FIG. 6 to the drone while at the same time also enabling marketing clients to bid for displaying content on the drone based on its location and a data analytics profile from social media posts and presence information of the audience present at the drone location.

FIG. 10 is a system module and data flow overview of a Social Gateway for airborne visualization. It describes the integration from a (mobile) end-user client as per FIG. 6 to the drone while at the same time also enabling marketing clients to bid for displaying content on the drone based on its location and a data analytics profile from social media posts and presence information of the audience present at the drone location. On the left side it shows incoming visualization requests from the end-user client as per FIG. 6. The end-user can also configure on the client if only his visualizations are allowed or if social marketing is allowed.

When social marketing is enabled the Social Gateway for airborne visualization will collect based on the drone's GPS location all available social media posts and presence information of the audience at the location. E.g.: Population volume, % Male, % Female, Age profile, Top Interests (weighted keywords). This profile will be offered to Marketing clients using a custom API as part of which the drone location, the audience social profile and minimum bid price is shared. Marketing clients will send bidding requests which will include their bidding price and the image or video that is to be visualized. After each bid above the minimum bid price the minimum price for subsequent bids is increased based on the last bids. The bidding continues until a predefined time before the drone is ready to start visualizing at which point the Social Gateway for airborne visualization will transmit the winning visual to the drone for display. Note that payment processing for simplicity is excluded from this figure as this would use existing market capabilities.

The invention claimed is:

1. A drone, said drone comprising:
a propeller section (20) and
a display section (21) comprising a screen (22) for displaying messages and/or images on a front side (28) of the screen, the display section being attached to the propeller section, the display section (21) comprises a screen support frame (23), wherein the support frame supports edges (24) of the screen; and
wherein rear support elements (26) are arranged for providing a wind void fraction of the screen (22), the wind void fraction is arranged as a grid of horizontal and vertical elongated openings and/or slits (27', 27").

2. The drone according to claim 1, wherein the screen support frame (23) comprises a first screen support element (25') connected to a first side edge (24') of the screen (22), and a second screen support element (25") connected to a second side edge (24") of the screen.

3. The drone according to claim 1, wherein the screen support frame (23) comprises rear screen support elements (26), which support a rear face (29) of the screen.

4. The drone according to claim 1, wherein, the wind void fraction of the screen is chosen between 50 and 80%.

5. The drone according to claim 1, wherein the propeller section (20) comprises propeller arms (41) for mounting propellers (40), the propeller arms are provided with a bend (42), and are mounted nearby outer ends (43) of the propeller section and are bent inwards towards a middle portion (44) of the propeller section.

6. The drone according to claim 5, wherein first segments (45', 45") of rear face propeller arms (41', 41") are provided with a support arm (46', 46") connected to first and second screen support elements (25', 25").

7. A drone, said drone comprising:
a propeller section (20) and
a display section (21) comprising a screen (22) for displaying messages and/or images on a front side (28) of the screen for which, a landing gear (30) is provided which can be moved from a landing position into a retracted position at a rear face (29) of the screen (22).

8. The drone according to claim 7, wherein the landing gear (30) is hingedly connected to the screen support frame (23), a hinged connection (31) is provided between the landing gear and both a first screen support element (25') and a second screen support element (25").

9. Method for displaying messages and/or images by using a group comprising two or more remotely controlled airborne drones provided with display means and controlled such that said messages and/or images are created and made visual by the display means of said group of airborne drones wherein said display means comprise LED's, OLED's or LCD based means or DLP and/or laser projection means.

10. System for displaying messages and/or images, comprising a group comprising two or more remotely controlled airborne drones provided with display means, and comprising control means arranged for controlling said drones such that said messages and/or images are created and made visual by the display means of said group of airborne drones, wherein said display means comprise LED's OLED's or LCD based means or DLP and/or laser projection means.

11. The system according to claim 10, wherein drones comprising a propeller section and a display section being attached to the propeller section and comprising a screen for displaying messages and/or images on a front side of the screen, and a screen support frame which supports edges (24) of the screen are selected.

12. System for displaying messages and/or images, comprising a group comprising two or more remotely controlled airborne drones provided with display means, and comprising control means arranged for controlling said drones such that said messages and/or images are created and made visual by the display means of said group of airborne drones, wherein said display means comprise LED's OLED's or LCD based means or DLP and/or laser projection means, comprising an Internet user interface for requesting and/or setting a session or series of sessions for displaying messages and/or images using said group of one or more remotely controlled air-borne drones with display means.

13. The system according to claim 12 wherein airborne visualization requirements from end-user clients and marketing clients are matched and combined trough an internet gateway for display by one or more drones at a given location.

14. A system for displaying messages and/or images, comprising a group comprising two or more remotely controlled airborne drones provided with display means, and comprising control means arranged for controlling said drones such that said messages and/or images are created and made visual by the display means of said group of airborne drones, wherein said display means comprise LED's OLED's or LCD based means or DLP and/or laser projection means comprising a software gateway for airborne visualization with artificial intelligence and analytics capabilities to determine the profile of the audience population at received drone location using social media posts and presence information.

15. The system according to claim 14 wherein a software bidding engine is used to match airborne visualization demand with supply.

* * * * *